United States Patent [19]
Goto et al.

[11] Patent Number: 5,900,878
[45] Date of Patent: May 4, 1999

[54] METHOD OF CONSTRUCTING PSEUDO-THREE-DIMENSIONAL IMAGE FOR OBTAINING CENTRAL PROJECTION IMAGE THROUGH DETERMINING VIEW POINT POSITION BY USING PARALLEL PROJECTION IMAGE AND APPARATUS FOR DISPLAYING PROJECTION IMAGE

[75] Inventors: Yoshihiro Goto, Tokyo; Hisako Nakamura, Abiko; Tomohiro Nagao, Kashiwa, all of Japan

[73] Assignee: Hitachi Medical Corporation, Tokyo, Japan

[21] Appl. No.: 08/708,959

[22] Filed: Sep. 6, 1996

Related U.S. Application Data

[63] Continuation-in-part of application No. 08/374,088, Jan. 18, 1995, Pat. No. 5,694,530.

[30] Foreign Application Priority Data

| Jan. 18, 1994 | [JP] | Japan | 6-003492 |
| Apr. 27, 1994 | [JP] | Japan | 6-089770 |
| Jun. 24, 1994 | [JP] | Japan | 6-143496 |
| Sep. 8, 1995 | [JP] | Japan | 7-231811 |

[51] Int. Cl.[6] ............................................. G06T 17/00
[52] U.S. Cl. ................................ 345/419; 345/421
[58] Field of Search ................................ 345/422, 423, 345/424, 425, 426, 427

[56] References Cited

U.S. PATENT DOCUMENTS

| 4,947,347 | 8/1990 | Sato | 364/522 |
| 5,293,467 | 3/1994 | Buchner et al. | 345/422 |
| 5,325,472 | 6/1994 | Horiuchi et al. | 345/427 |
| 5,412,764 | 5/1995 | Tanaka | 345/424 |

OTHER PUBLICATIONS

IEEE CG & A Jan. 1985, pp. 52–60.

*Primary Examiner*—Phu K. Nguyen
*Assistant Examiner*—Cliff N. Vo
*Attorney, Agent, or Firm*—Antonelli, Terry, Stout & Kraus, LLP

[57] ABSTRACT

With respect to a stacked three-dimensional image, a point of view and a first projection plane are set, a central projection image is obtained according to a central projection method, and this image is shaded to obtain a first pseudo-three-dimensional image as if the image was observed under an endoscope. Then, a second projection plane is set with a positional relation so as to be perpendicular to the first projection plane and a second pseudo-three-dimensional image is obtained by projecting the same stacked three-dimensional image according to a parallel projection method and performing shading. An updated position of a new view point is obtained by using the second pseudo-three-dimensional image.

24 Claims, 11 Drawing Sheets

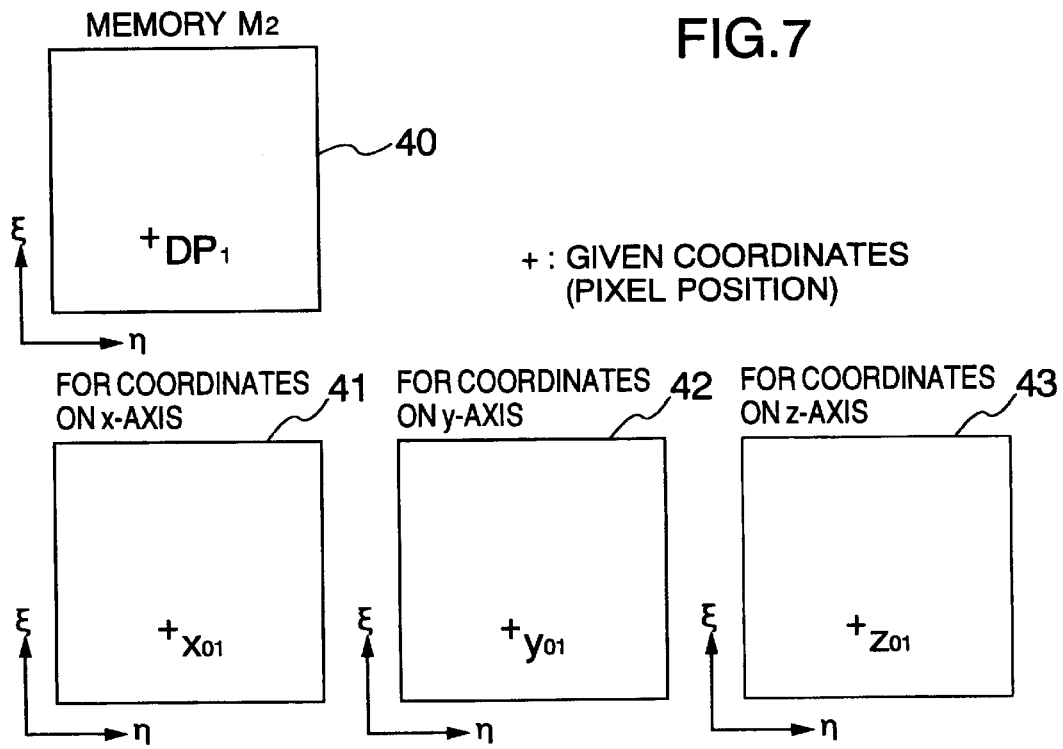
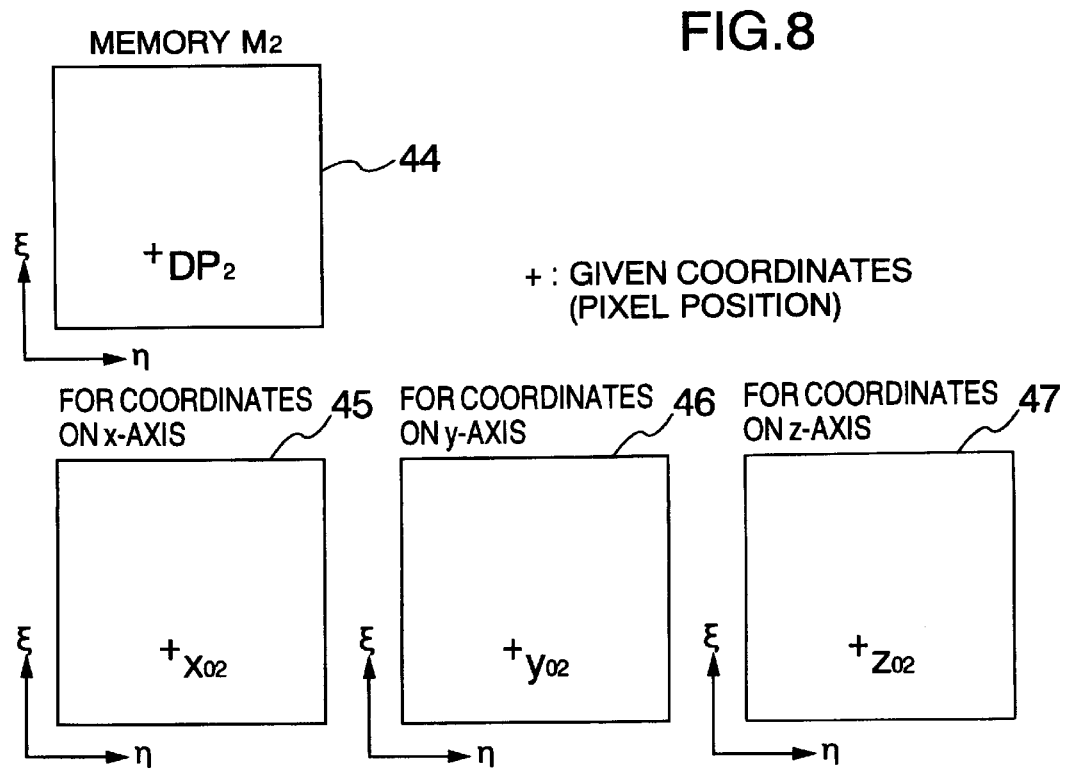

METHOD OF CONSTRUCTING PSEUDO-THREE-DIMENSIONAL IMAGE FOR OBTAINING CENTRAL PROJECTION IMAGE THROUGH DETERMINING VIEW POINT POSITION BY USING PARALLEL PROJECTION IMAGE AND APPARATUS FOR DISPLAYING PROJECTION IMAGE

CROSS-REFERENCE TO RELATED APPLICATIONS

The present application is a continuation-in-part of U.S. patent application Ser. No. 374,088 filed on Jan. 18, 1995, now U.S. Pat. No. 5,694,530, under the title "METHOD OF CONSTRUCTING THREE-DIMENSIONAL IMAGE ACCORDING TO CENTRAL PROJECTION METHOD AND APPARATUS FOR THE SAME", the disclosure of which is hereby incorporated by reference.

BACKGROUND OF THE INVENTION

The present invention relates to a display apparatus adapted for obtaining pseudo-three-dimensional images, particularly for obtaining dynamic pseudo-three-dimensional images as if such images were observed under an endoscope when the endoscope was moved.

There is a technique in which X-ray computerized tomographic images are stacked up to thereby construct a stacked three-dimensional image (hereinafter referred to as "three-dimensional original image") so that the stacked three-dimensional image is directly displayed on a two-dimensional screen or a projection image obtained by projecting the stacked three-dimensional image onto a projection plane from a certain view point is displayed. The technique is directly used for inspection, diagnosis and surgery or used for supporting them. The technique is also applied to any field other than X-ray computerized tomographic images, in which a three-dimensional image measured three-dimensionally by an MRI apparatus is developed into two-dimensional tomographic images to be used as X-ray computerized tomographic images.

For projection onto a projection plane, there are a parallel projection method and a central projection method. The parallel projection method has been described in IEEE CG & A, January (1985), pp. 52–60. The central projection method is superior in that a projection image is obtained as if the image was observed under an endoscope. The detail of the central projection method is disclosed in U.S. patent application Ser. No. 374,088 which has one inventor in common with the present application and is assigned to the same assignee as the present application. In U.S. patent application Ser. No. 374,088, there are shown the significance of updating of a view point, the way thereof and examples thereof in the case where the view point is updated as if observation was made under an endoscope while the endoscope was moved.

The updating of the view point in U.S. patent application Ser. No. 374,088 can be performed relatively easily if a method of giving coordinates of the view point to be updated in advance or a method of setting the coordinates by using a data input means such as a keyboard is used. It is however difficult to update the view point by using a cursor, or the like, on a display screen while an image displayed on the display screen by a central projection method is watched. Assume now that, for example, an image of a human bronchial tube in a depth direction of from the front to the back is obtained by a central projection method and displayed. Because the distance in the depth direction is not displayed on the screen, it is impossible to set a new view point in the depth direction at a predetermined distance accurately.

Accordingly, in order to make it possible to set the position of the new view point accurately on the display screen, it is necessary that an image effective for updating the view point is displayed.

SUMMARY OF THE INVENTION

An object of the present invention is to provide a method of constructing a projection image, a method of constructing a pseudo-three-dimensional image and a display apparatus in which an image effective for updating a view point is obtained by a parallel projection method so that a new view point can be set and inputted on the image.

The present invention discloses a method of constructing a projection image in which a first projection image by a central projection method and a second projection image by a parallel projection image are obtained from one and the same stacked three-dimensional image.

Further, the present invention discloses a method of constructing a pseudo-three-dimensional image in which the aforementioned stacked three-dimensional image is projected onto a first projection plane by using a view point and the first projection plane as a pair according to a central projection method and shaded to thereby obtain a pseudo-three-dimensional image and in which the aforementioned stacked three-dimensional image is projected onto a second projection plane according to a parallel projection method so as to form positions containing the view point or the neighborhood of the view point as a projection-subject region and shaded to thereby obtain a pseudo-three-dimensional image.

In the parallel projection method, the second projection plane forms a view point plane.

Further, the present invention discloses a projection image display apparatus for updating a view point and a first projection plane as a pair so that a central projection image obtained by projecting the stacked three-dimensional image onto the first projection plane is shaded and displayed, the projection image display apparatus including: a first memory for storing a first pseudo-three-dimensional image obtained by shading the central projection image; a second memory for storing a second pseudo-three-dimensional image obtained by parallelly projecting the stacked three-dimensional image onto a second projection plane perpendicular to the first projection plane and shading the parallel projection image, wherein a pixel which is farther from the second projection plane is projected when there are a plurality of projection-subject points; a display unit; and a device in which the second pseudo-three-dimensional image stored in the second memory is displayed on a display screen of the display unit so that a new view point is set on the displayed second pseudo-three-dimensional image as a substitute for the view point with respect to the image stored in the first memory.

According to the present invention, a parallel projection image having information of the depth of a central projection image is obtained on the basis of original image data used when the image is projected onto a central projection image plane from a view point and shaded.

BRIEF DESCRIPTION OF THE DRAWINGS

FIG. 7 is a view showing an example of configuration of a memory $M_2$ for storing a pixel which is farthest from a view point plane in the parallel projection method;

FIG. 8 is a view showing an example of configuration of a memory $M_3$ for storing a pixel which is nearest to the view point plane in the parallel projection method;

DESCRIPTION OF THE PREFERRED EMBODIMENTS

Figure 1:
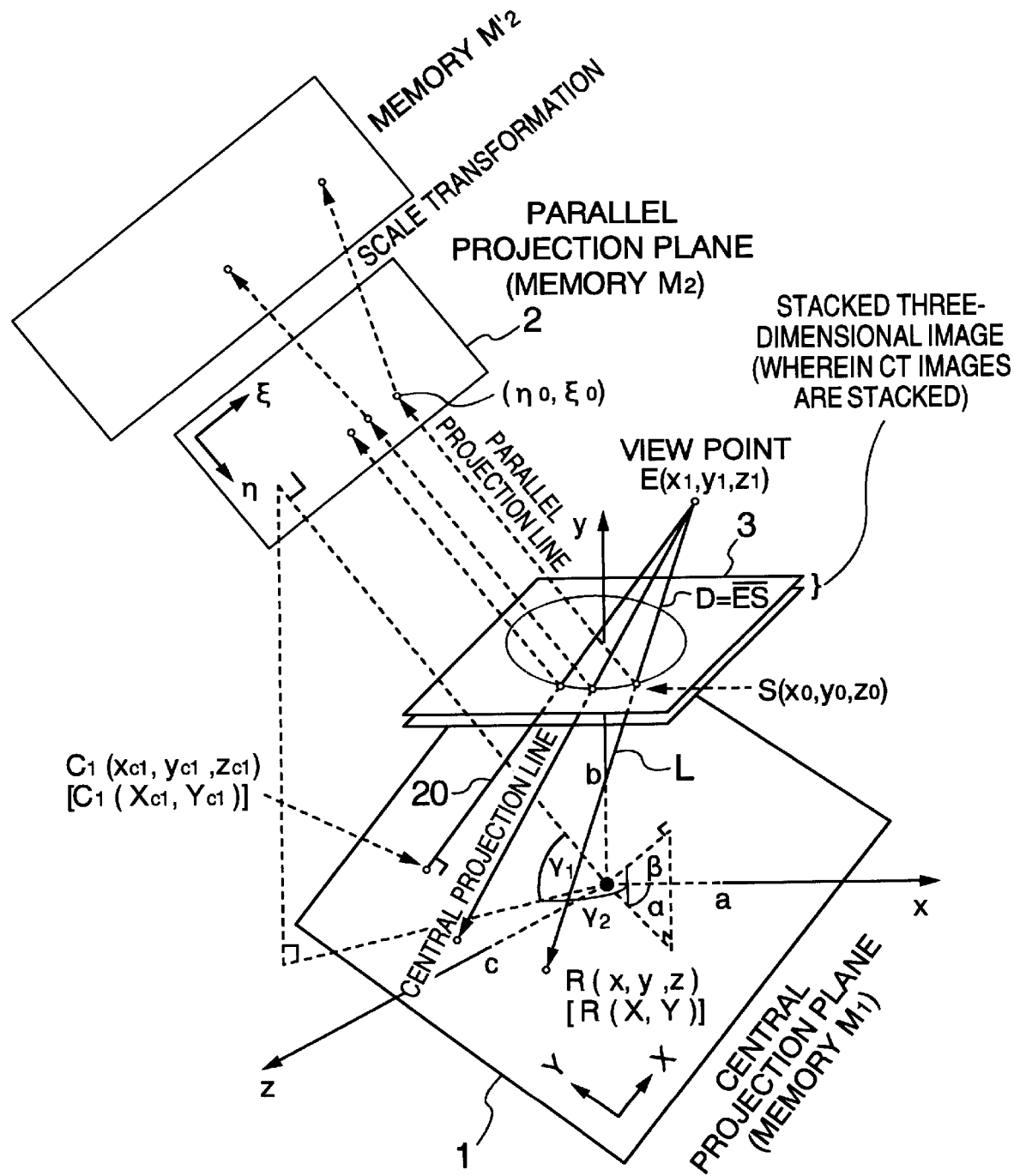
FIG. 1 is a view for explaining the principles of a central projection method and a parallel projection method.

FIG. 1 is a view for explaining a central projection method and a parallel projection method using data projected by the central projection method. A plurality of tomographic images are stacked up and then centrally projected onto a projection plane 1 (central projection plane) from a view point E.

On the other hand, the parallel projection method is a projection method in which a stacked three-dimensional image is parallelly projected. The parallel projection method is suitable for obtaining an exterior image of the stacked thee-dimensional image or a cut image obtained by cutting the stacked three-dimensional image in a cut plane.

In either of the central projection method and the parallel projection method, pixel values obtained on a projection plane are not the very pixel values on the stacked three-dimensional image. The image obtained on the projection plane is an image which is shaded so that the pixel value decreases (the luminance value decreases) as the distance between the view point and the pixel to be projected increases and that the pixel value increases (the luminance value increases) as the distance between the view point and the pixel to be projected decreases. That is, the image is displayed so that a far subject looks dark and that a near subject looks light. Various methods such as a depth method, a surface method, a volume rendering method, and so on, are employed for this shading. Further, a plurality of pixels may be projected onto one and the same projection pixel position. That is, there may be the case of projection from a plurality of projection-subject points onto one projection point. Such overlapping is caused by the fact that two or more projection-subject pixels exist in a direction of depth with respect to one and the same projection pixel position. Therefore, deep-side projection-subject pixels are deleted so that only the nearest (or furthest) projection-subject pixel with respect to the projection plane is selected as a projection pixel in this position. This process is called a "display pixel selecting process". When a plurality of pixels overlap one another, the nearest projection-subject pixel is projected and displayed by this process.

The projection image obtained by shading and display pixel selection as described above is called a "pseudo-three-dimensional image", because the pixel values on the projection image are not the very pixel values on the stacked three-dimensional original image but are pseudo pixel values and the projection image is apparently three-dimensionally displayed when the projection image is displayed on a display screen.

In FIG. 1, the projection plane 2 is a parallel projection plane which is obtained by a parallel projection method and which serves as a view point plane. A projection-subject image used in this occasion is the stacked three-dimensional image used for projection according to the central projection method.

The projection plane 2 may be set in an arbitrary spatial position but the most useful is a projection plane parallel to orthogonal projection lines 20 perpendicularly incident to the projection plane 1 from a view point E, that is, the most useful is the case where the projection planes 1 and 2 are perpendicular to each other. In this occasion, an image which is seen from the view point E as if the image was observed under an endoscope is obtained on the projection plane 1, and a parallel projection image which is seen from the projection plane 2 perpendicular to the orthogonal projection lines 20 from the view point E is obtained on the projection plane 2. That is, the projection plane 2 serves as a view point plane.

Figure 2:
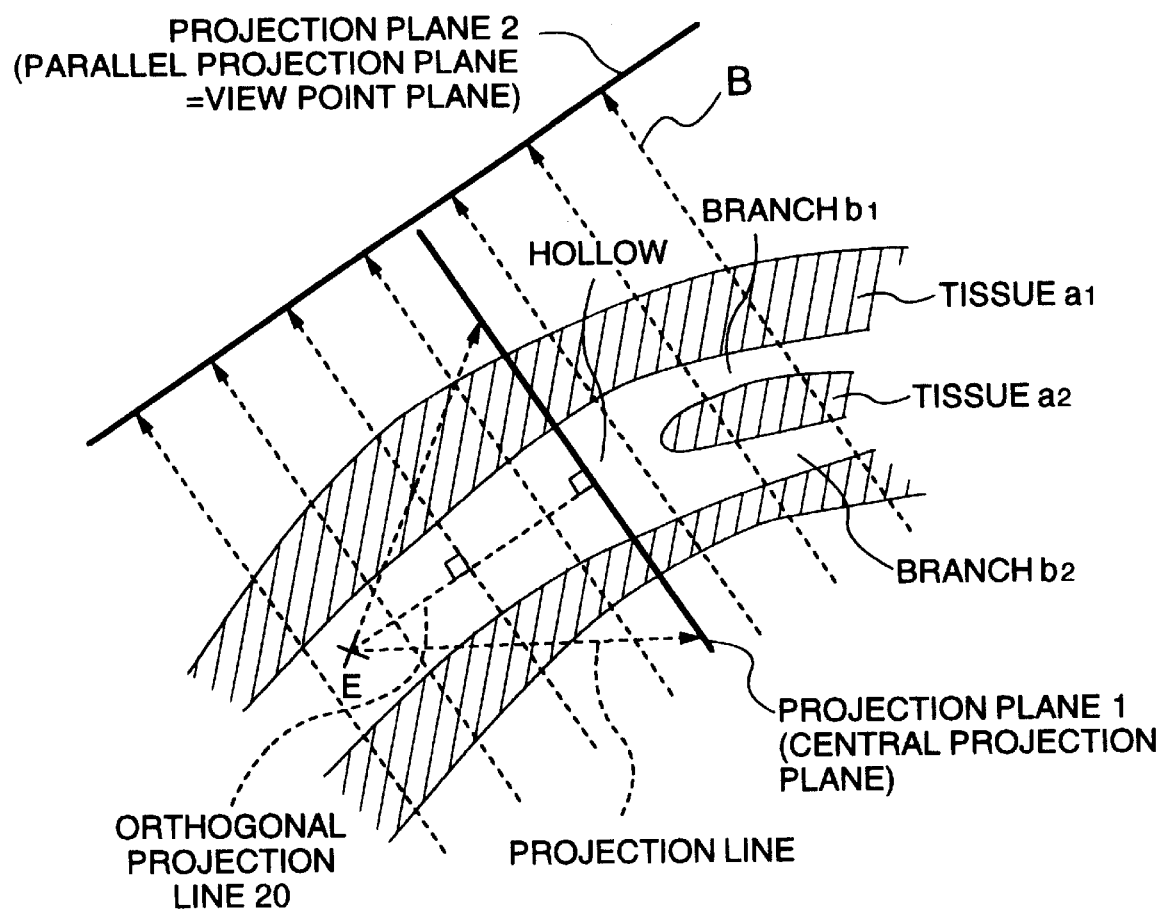
FIG. 2 is a view showing the relation between a central projection image and a parallel projection image according to the present invention.

This positional relation is shown in FIG. 2. FIG. 2 shows an image of a living tissue $a_1$ having a hollow in its inside. The hollow branches at a living tissue $a_2$ into two branches ($b_1$, $b_2$). For example, the image is of bronchial tubes. The view point E is placed in the hollow and central projection onto the projection plane 1 is performed to obtain a pseudo-three-dimensional image. On the other hand, the projection plane 2 is set in an arbitrary position parallel to the orthogonal projection line 20 and pixel data in pixel positions (projection-subject points) used for projection onto the projection plane 1 are projected onto the projection plane 2.

As a result, an endoscopic image seen from the view point E is obtained on the projection plane 1 and a parallel projection image obtained when the stacked three-dimensional image is seen from the projection plane 2 is obtained on the projection plane 2.

Of course, the projection plane 2 may be disposed so as to be not parallel to the orthogonal projection line but at an arbitrary angle.

Further, the projection planes 1 and 2 may be practically considered as projection memories corresponding to the projection planes 1 and 2, so that projection points can be defined by addresses of the projection memories. Further, when the projection memory is larger than the image memory, an image of the image memory size is extracted (read) from the projection memory, stored in the image memory and displayed. When the size of the projection memory is equal to the size of the image memory, the contents of the projection memory are directly displayed as the image memory or displayed after the contents of the projection memory are directly transferred to the image memory.

The way of using the parallel projection image in the present invention will be described below. Firstly, the parallel projection image is used for apparently observing the position and situation of the central projection image in the case where the endoscopic image seen by the central projection method is seen laterally. Secondly, the parallel projection image is used for designating the position of a new view point in the case where the view point is updated (moved forward or backward) to obtain dynamic central projection images. The term "laterally" means a direction in which the view point and the projection plane 1 can be seen from the side, and in FIG. 2, this shows the case of observation from the projection image plane 2. The arrow B shows a direction of projection, and the view point is located on the projection plane 2.

Figure 3A:
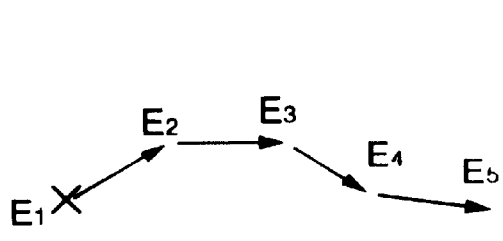
FIGS. 3A and 3B are views showing an embodiment in which a view point is updated.

Judging from the parallel projection image in the lateral direction, the direction toward which the view point E must be updated will become clear. In the updating of the view point E, it is rare that the view point is updated at intervals of a predetermined length on one line. For example, a curved updating locus $E_1 \to E_2 \to E_3 \to E_4 \to E_5$ may be taken as shown in FIG. 3A. In this case, the forward or backward motion of the view point cannot be grasped easily only by seeing the displayed central projection image, so that updating of the view point as shown in FIG. 3A is made difficult. The respective positions of $E_1, E_2, \ldots E_5$ must be known by intuition or obtained in advance so that the view point is updated on the basis of the positions.

Figure 3B:
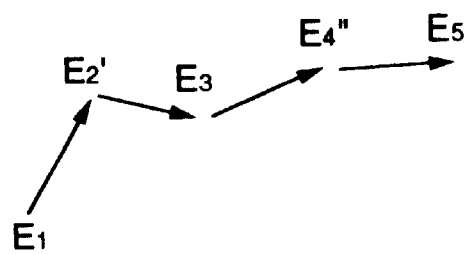

Further, the locus $E_1$ to $E_5$ may be disposed on one plane or may be disposed on different planes. FIG. 3B shows an example of this case, that is, an example of updating in which $E_2'$ and $E_4''$ are disposed on different planes. That is, $E_1$, $E_3$ and $E_5$ are points on one and the same plane as shown in FIG. 3A whereas $E_2'$ and $E_4''$ show an example of updating in a locus onto any plane other than the aforementioned plane.

In the setting of the updated view point seen laterally, there is employed a method in which the parallel projection image seen laterally is displayed on the screen, the updated position is set on the image, and this is read by a mouse cursor and latched in the memory. The detail of the method will be described later in the description of FIGS. 5 and 6.

Figure 4:
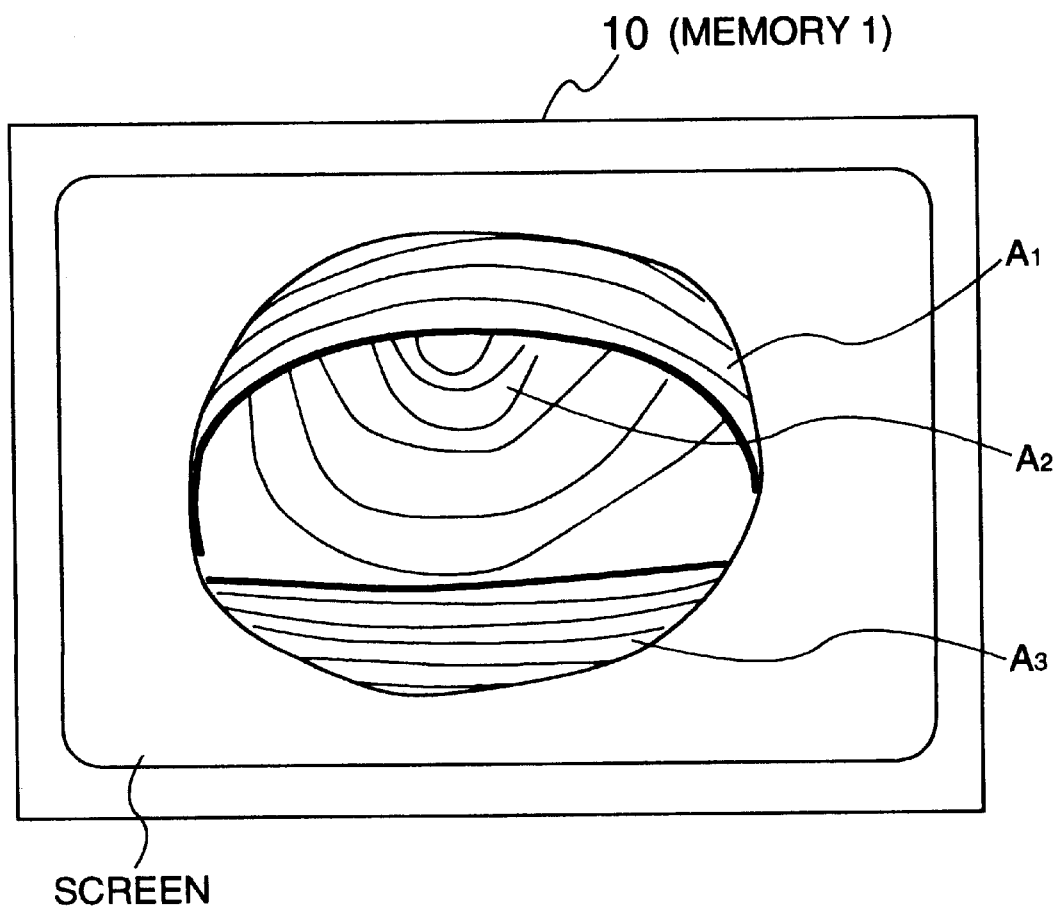
FIG. 4 is a view showing an example of display of an image obtained by a central projection method.
Figure 5:
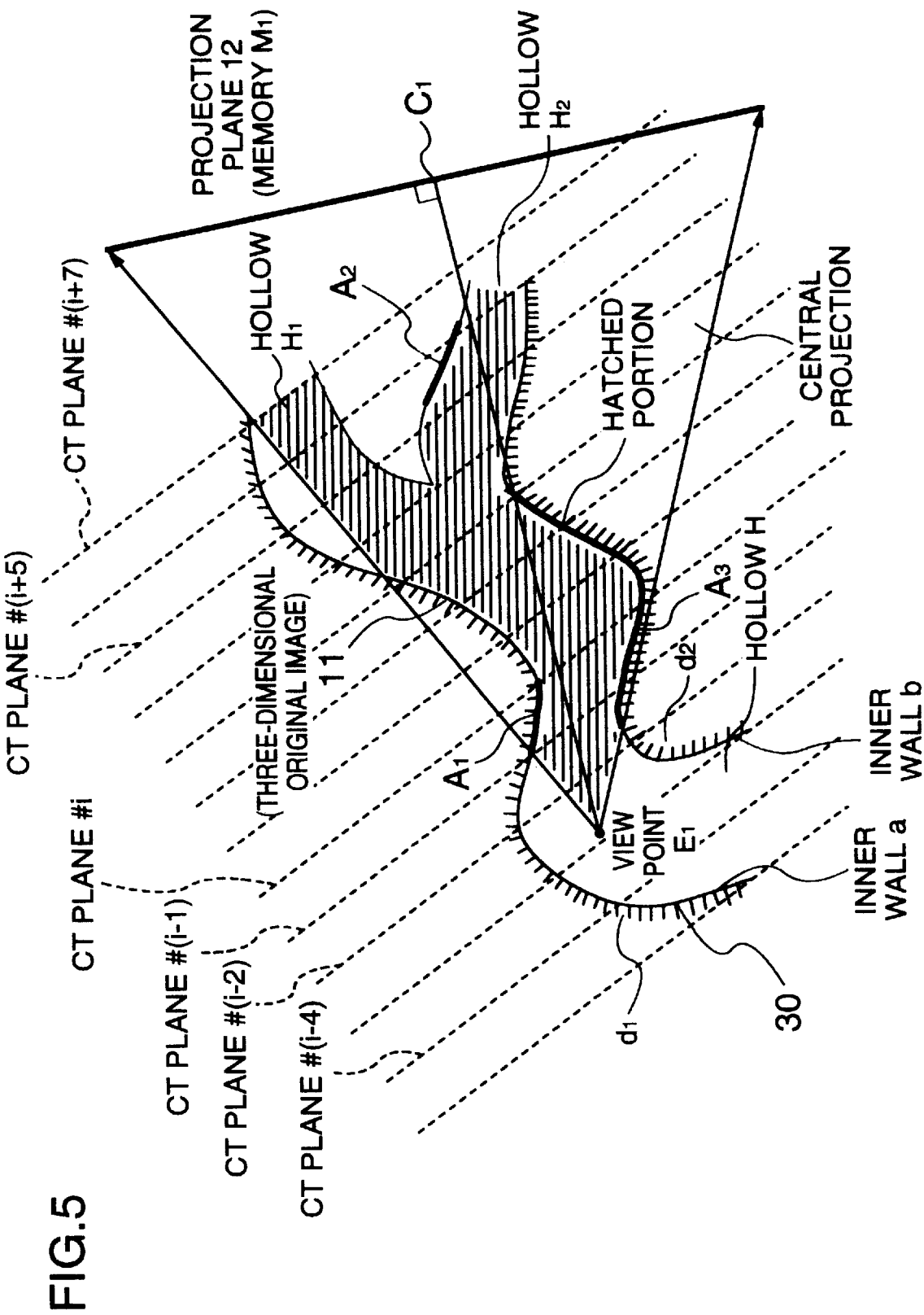
FIG. 5 is a view for explaining the central projection method for obtaining the image depicted in FIG. 4.
Figure 6:
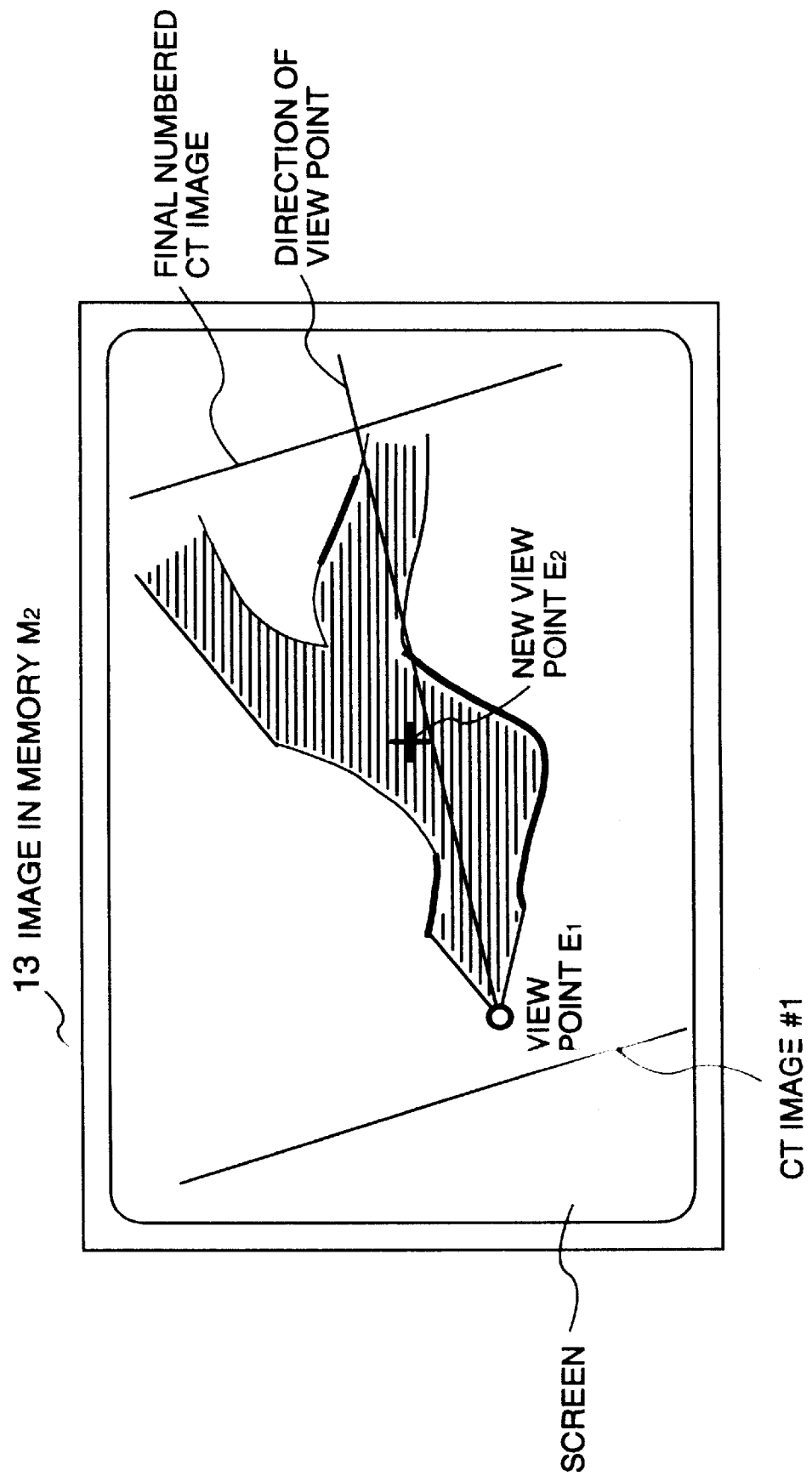
FIG. 6 is a view showing an example of display of an image obtained by a parallel projection method in the case of FIG. 5.

FIG. 4 shows an endoscopic display image obtained by the central projection method. FIG. 5 is a view showing the relations between the view point $E_1$, the three-dimensional image 11 and the projection plane 12 for obtaining the image of FIG. 4. FIG. 6 is a view showing a cross-sectional image seen laterally and obtained by the parallel projection method.

In FIG. 5, a plurality of computerized tomographic planes ( . . . , #i, . . . ) are stacked up parallelly to obtain a three-dimensional image, and a view point $E_1$ and a projection plane 12 are given thereto so that an endoscopic image projected onto the projection plane 12 from the view point $E_1$ is obtained by the central projection method. For example, the three-dimensional original image 11 is an image having an inner hollow portion H and outer tissues $d_1$ and $d_2$ (hatched) separated by inner walls a and b and, in the deep side, the hollow portion H branches into two hollows $H_1$ and $H_2$.

The image projected onto the projection plane 12 from the view point $E_1$ is written in the memory $M_1$ (which will be described later), and the display image thereof is as shown in FIG. 4. Here, the hatched portion on the three-dimensional original image from the view point $E_1$ to the projection plane 12 in FIG. 5 forms a projection-subject region in the central projection method. In practical projection, however, a display pixel selecting process is carried out, so that the frontmost portions $A_1, A_2$ and $A_3$ in the hatched portion from the view point $E_1$ form a real projection image. In each of FIGS. 4 and 5, $A_1, A_2$ and $A_3$ refer to the same parts correspondingly.

FIG. 6 shows a parallel projection image thereof. This is an image written in the memory $M_2$ (which will be described later). FIG. 6 is a view obtained by seeing FIG. 5 from a (cross-sectional) direction perpendicular to the plane of paper. That is, a projection plane (view point plane) is located to be parallel to the plane of paper and above the plane of paper and the image on the plane of paper is projected onto the projection image to form FIG. 6. The thick line portion and the hatched portion in FIG. 6 are not displayed on the screen but are shown in FIG. 6 for the purpose of comparison with FIG. 5. In the image of FIG. 6, the right hand direction shows the depth direction and the left hand direction shows the neighborhood of the current view point $E_1$. In order to set a new view point in the direction of the depth, the symbol X is displayed by designating a point such as $E_2$ in FIG. 6 on the screen through a mouse and this point is clicked through the mouse to thereby read in the coordinates of the new view point $E_2$. A new projection plane corresponding to the read-in new view point $E_2$ is set so that a central projection image from the new view point $E_2$ is formed on the new projection plane.

In this manner, an image obtained by laterally seeing the direction of updating of the view point is displayed on the screen of FIG. 6, so that a new view point can be set accurately on this image. Although FIG. 6 shows the case of one new view point $E_2$, two or three view points may be set on one image shown in FIG. 6. Of course, after a parallel projection image as shown in FIG. 6 is obtained with respect to the new central projection image obtained on the basis of the new view point $E_2$, a new view point $E_3$ may be set newly on the basis of the parallel projection image.

The present invention will be described below specifically.

In FIG. 1, the coordinate system of the stacked three-dimensional image is now assumed to be given by x, y and z. Here, y is an ordinate in the stacking direction, and x and z are coordinates of a pixel on each computerized tomographic image plane. The coordinate system of the central projection plane is given by X and Y. Further, the coordinate system of the parallel projection plane is given by $\eta$ and $\xi$.

Respective coordinates shown in FIG. 1 and the positions thereof will be defined below.

Let the coordinates of the view point E be $(x_1, y_1, z_1)$. Let the coordinates of the intersection $C_1$, between a perpendicular drawn from the view point E to the central projection plane 1 and the projection plane 1 be $(X_{C1}, Y_{C1}, Z_{C1})$ in the x-y-z coordinate system and $(X_C, Y_C)$ in the X-Y coordinate system.

Let the coordinates of a projection-subject point S of a computerized tomographic image on an arbitrary central projection line L be $(x_0, y_0, z_0)$.

Let the coordinates of a projection point R on the central projection line L in a central projection plane be (x, y, z) in the x-y-z coordinate system and (X, Y) in the X-Y coordinate system.

Other related parameters in FIG. 1 are as follows.

The symbols a, b and c are parameters showing the positional relation between the central projection plane P and the x-y-z coordinate system. The symbol a is the distance from the origin to the intersection between the x axis and the central projection plane P in the x-y-z coordinate system. The symbol b is the distance from the origin to the intersection with respect to the y axis. The symbol c is the distance from the origin to the intersection with respect to the z axis.

The symbol $\gamma_1$ is an angle between the perpendicular drawn from the origin in the x-y-z coordinate system to the parallel projection plane 2 and the xz plane (computerized tomographic plane).

The symbol $\gamma_2$ is an angle between the x axis and a line obtained by further projecting the perpendicular onto the xz plane.

The symbol $\alpha$ is an angle between the x axis and a line obtained by drawing the perpendicular from the origin in the x-y-z coordinate system to the central projection plane 1 and further projecting the perpendicular onto the xz plane.

The symbol $\beta$ is an angle between the perpendicular and the xz plane.

Further, the central projection plane 1 actually corresponds to a projection memory and this is made memory $M_1$. Further, the parallel projection plane 2 actually corresponds to a projection memory and this is made memory $M_2$. When the scale of the memory $M_2$ is small, the coordinates of the memory $M_2$ are scaled up to those of the memory $M_2'$.

FIG. 7 shows the memory $M_2$ for storing the depth image on the parallel projection plane 2. Let the abscissa axis be $\eta$. Let the ordinate axis be $\xi$. The memory $M_2$ is constituted by four memory parts 40, 41, 42 and 43. The memory part 40 stores the pixel value $DP_1$ of a pixel point which is farthest from the parallel projection plane in the $\eta$-$\xi$ coordinate system, and the memory parts 41, 42 and 43 store the coordinates $x_{01}$, $y_{01}$ and $z_{01}$ of the pixel point on the computerized tomographic image 3 in the x-y-z coordinate system.

FIG. 8 shows a memory $M_3$ for storing the depth image on the parallel projection plane 2. The memory $M_3$ is constituted by four memory parts 44, 45, 46 and 47. In the memory $M_3$, the pixel value $DP_2$ of a pixel point which is nearest to the parallel projection plane 2 at the time of parallel projection is stored in the memory part 44, and the coordinates $x_{02}$, $y_{02}$ and $z_{02}$ of the pixel point in the x-y-z coordinate system are stored in the memory parts 45, 46 and 47.

The definition of "farthest" and "nearest" will be described here. With respect to one parallel projection line, the projection line pierces the plurality of computerized tomographic planes, so that there are a plurality of intersections. The plurality of intersections are projection-subject points onto the parallel projection plane. Of the plurality of intersections, an intersection (projection-subject point) which is nearest to the view point plane and one of the intersections used to construct a three-dimensional image according to a central projection method is defined as the nearest pixel point. Conversely, an intersection (projection-subject point) which is farthest from the view point plane and one of the intersections used to construct a three-dimensional image according to a central projection method is defined as the farthest pixel point. This definition is applied to all parallel projection lines.

Figure 9:
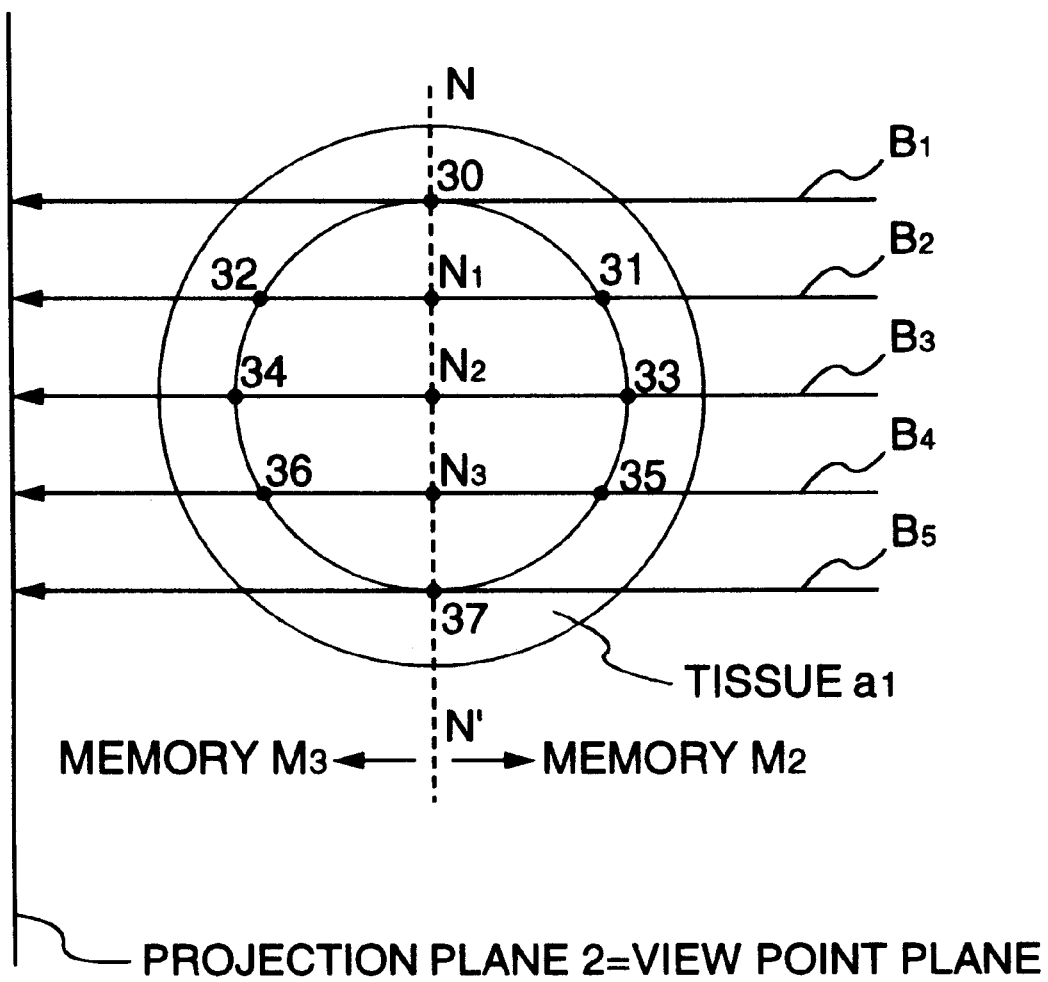
FIG. 9 is a view for explaining the relations between projection-subject points and the memories $M_2$ and $M_3$.

FIG. 9 is a view for explaining pixel points stored in the memories $M_2$ and $M_3$.

FIG. 9 is an overall view of the tubular tissue $a_1$ in the direction of from the view point E side to the projection plane 1 as shown in FIG. 2. $B_1$ to $B_5$ are projection lines merely showing a direction of projection. The direction of view lines is reverse to the direction of the projection lines $B_1$ to $B_5$. That is, in FIG. 9, the projection plane 2 is a view point plane, and an image obtained by seeing the tissue $a_1$ from the view point plane is therefore obtained on the basis of the view point plane.

The projection lines $B_1$ and $B_5$ contact the inner surface of the tissue $a_1$ at points 30 and 37 respectively. The projection lines $B_2$ to $B_4$ intersect the inner surface of the tissue $a_1$ at points 31 to 36. The intersections between the projection lines and the inner surface of the tissue become projection-subject points. With respect to the projection line $B_2$, a pixel point which is farthest from the projection plane 2 is the intersection 31, and the pixel value of this intersection is stored as $DP_1$ in the memory $M_2$. A pixel point which is nearest to the projection plane 2 is the intersection 32, and the pixel value of this intersection is stored as $DP_2$ in the memory $M_3$. The contact points 30 and 37 may be stored in either of the memories $M_2$ and $M_3$.

The intermediate point between the inter-sections 31 and 32 is point $N_1$, the intermediate point between the intersections 33 and 34 is point $N_2$, and the intermediate point between the intersections 34 and 35 is point $N_3$. As will be described later with reference to FIG. 12, these intermediate points $N_1$ to $N_3$ are set as positions of view points for central projection.

As apparent from FIG. 9, with respect to the contact points 30 and 37 as a boundary on the inner surface of the tissue $a_1$, the pixel values and coordinates of pixel points which are farther from the projection plane 2 are stored in the memory $M_2$, whereas the pixel values and coordinates of pixel points which are nearer to the projection plane 2 are stored in the memory $M_3$. That is, pixel points on the right side of a line N–N' passing through the contact points 30 and 37 and the intermediate points $N_1$ to $N_3$ are stored in the memory $M_2$ whereas pixel points on the left side of the line N–N' are stored in the memory $M_3$.

Figure 10:
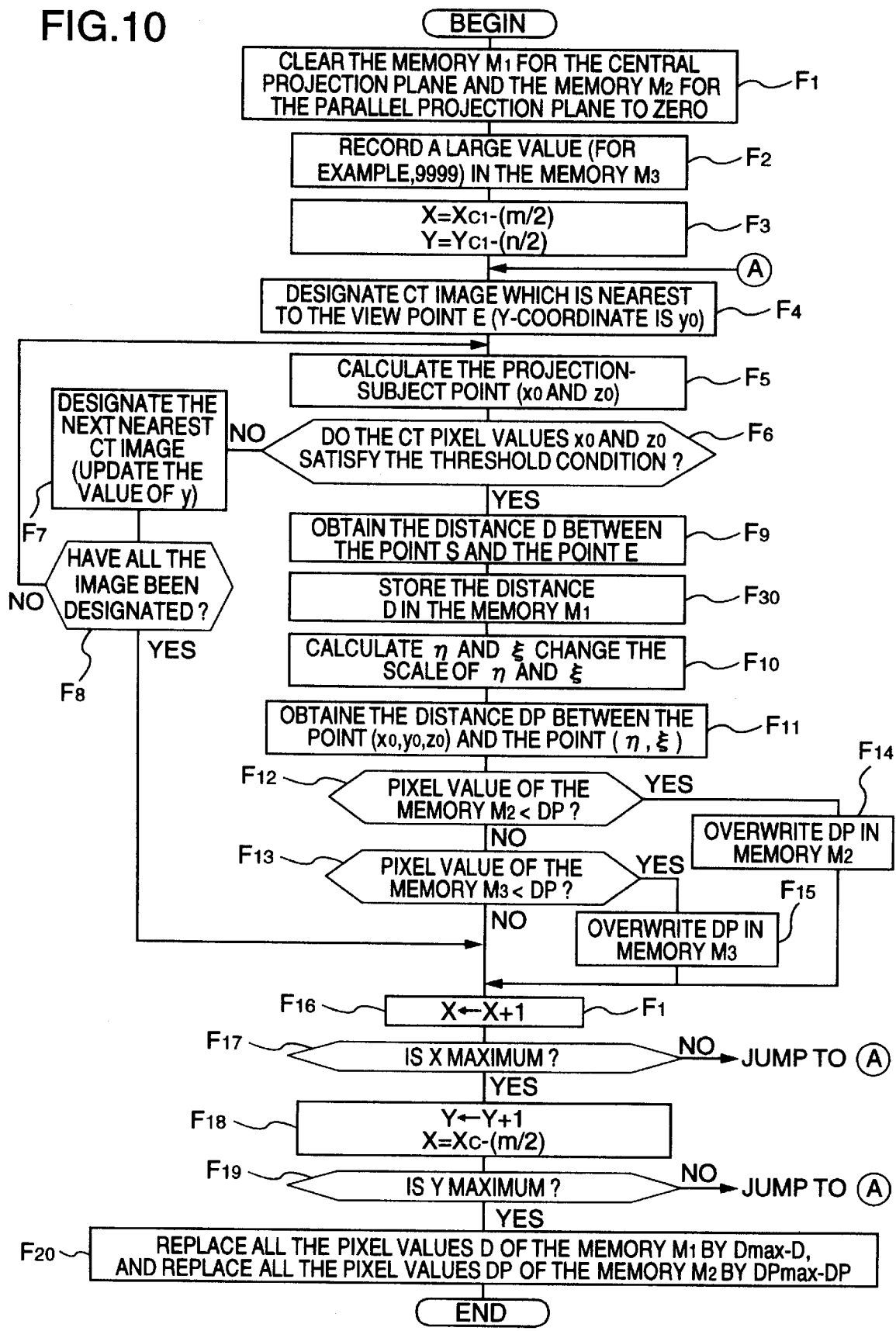
FIG. 10 is a flow chart showing an embodiment of image construction using a central projection method and a parallel projection method according to the present invention.

FIG. 10 shows an example of a flow chart of a process in the present invention. This program is written in a recording medium.

First, in a step $F_1$, the memory $M_1$ for the central projection plane and the memory $M_2$ for the parallel projection plane are cleared to be zero. In a step $F_2$, the memory $M_3$ for the parallel projection plane is initialized to be the maximum value (for example, 9999). The reason why the maximum value is set is that pixel values and coordinates of projection-subject points which are nearer to the parallel projection plane are stored in the memory $M_3$.

The central projection plane and the parallel projection plane are set to have such a positional relation that a predetermined angle is formed therebetween on a memory space. For example, these two planes are set so as to be perpendicular to each other.

Figure 11:
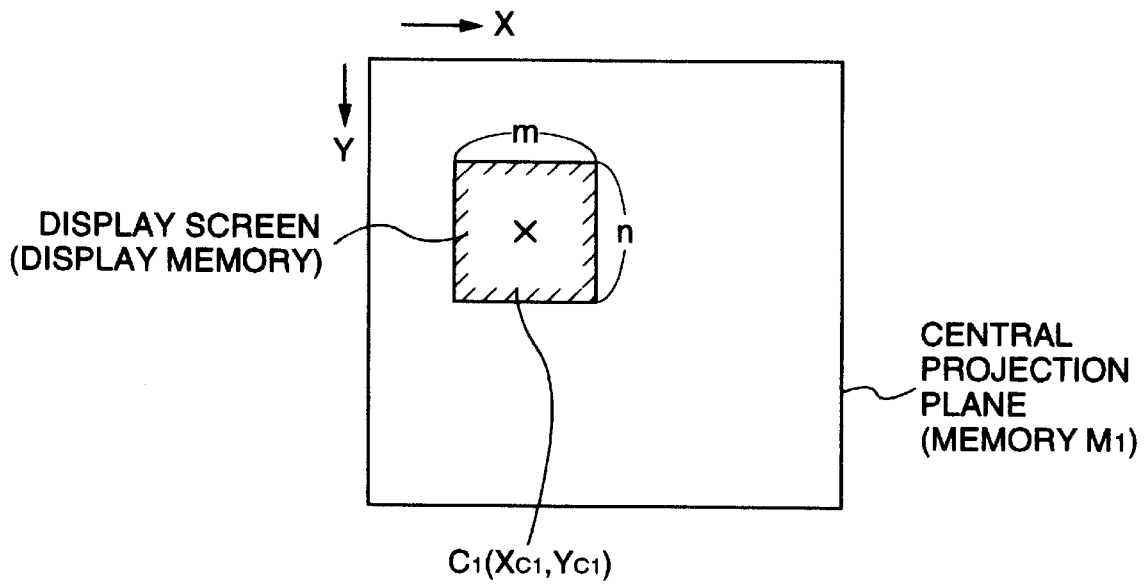
FIG. 11 is a view showing the relation between a central projection plane and an image display screen.

In a step $F_3$, the initial coordinates X and Y of the display screen on the central projection plane (that is, memory $M_1$) are set. An example of extraction of the display screen is shown in FIG. 11. FIG. 11 shows an example in which the display screen is extracted, as the center of the screen, (vertical image size)×(horizontal image size)=m×n from the intersection $C_1$ (hereinafter referred to as "orthogonal intersection $C_1$") between a perpendicular drawn from the view point E to the projection plane 1 and the projection plane 1. The reason why the orthogonal intersection $C_1$ is used as the center is that the central projection plane is selected to be perpendicular to view lines and the position of orthogonal intersection is the orthogonal intersection $C_1$. Further, the initial coordinates X and Y are in the left upper end position of the extracted image of m×n size and given by the following expression 1:

$$X = X_{C_1} - (m/2)$$
$$Y = Y_{C_1} - (m/2) \quad (1)$$

in which $X_{C_1}$ and $Y_{C_1}$ are the coordinates of the orthogonal intersection $C_1$.

In a step $F_4$, a computerized tomographic image which is nearest to the view point E is designated. As an example of FIG. 5, the computerized tomographic image which is nearest to the view point E is a tomographic plane #(i−2). In a step $F_5$, there are calculated the coordinates $x_0$ and $z_0$ of an intersection (that is, projection-subject point) on computerized tomographic images in each central line when central projection lines are formed radially with respect to the nearest computerized tomographic image. Judging from the relation between the step $F_5$ and the step $F_3$, this calculation is equivalent to the calculation of the coordinates $x_0$ and $z_0$ of a projection-subject point in the case where X and Y in the expression 1 are the coordinates of a projection point. An expression of coordinate transformation from $x_0$ and $z_0$ to X and Y in the expression 1 will be described later.

Incidentally, the designation of a computerized tomographic image which is nearest to the view point E in the step $F_4$ can be performed by comparing the y ordinate value of the computerized tomographic plane (that is, computerized tomographic image) with the y ordinate value of the view point E and finding the y ordinate value of a computerized tomographic plane which is nearer to the projection plane than the view point and nearest to the y ordinate value of the view point E.

In a step $F_6$, a judgment is made as to whether the computerized tomographic pixel value of the projection-subject point $x_0$ and $z_0$ obtained in the step $F_5$ satisfies a threshold value or not. Here, the threshold value is a reference value of extraction. If the threshold value condition is satisfied, the situation of the routine goes to a step $F_9$. If the threshold value condition is not satisfied, the situation of the routine goes to a step $F_7$. For example, the threshold value is a value which is such that a region of interest in organs can be extracted when the region of interest is to be extracted.

In a step $F_7$, the next nearest tomographic image (tomographic plane) (#(i−1) in the example of FIG. 5) is designated. In a step $F_8$, a judgment is made as to whether the designation of all images (#(i−2) to #(i+7) in the example of FIG. 5) is finished or not, that is, as to whether the designation of the last image #(i+7) is finished or not. If the designation is not finished yet, the situation of the routine goes to the step $F_5$. If the designation of the last image #(i+7) is completed, the situation of the routine goes to a step $F_{16}$.

In a step $F_9$, the distance D between the view point E and the projection-subject point S is obtained. The distance D is given by the following expression 2.

$$D = \sqrt{(x_1 - x_0)^2 + (y_1 - y_0)^2 + (z_1 - z_0)^2} \quad (2)$$

In a step $F_{30}$, the distance D is written in the projection position R (X, Y) of the memory $M_1$. In this occasion, when projection is performed by a plurality of projection-subject points onto one projection position, a plurality of values of D are obtained correspondingly to the plurality of projection-subject points. However, the minimum distance D of the plurality of distances D is written finally (this is a display pixel selection process for removing farther projection-subject points).

In a step $Fl_{10}$, the coordinates $(\eta_0, \xi_0)$ of a parallel projection point projected from the projection-subject point S $(x_0, y_0, z_0)$ onto the parallel projection plane 2 are obtained from the expression 3:

$$\eta_0 = x_0 \cdot \cos \gamma_2 + z_0 \cdot \sin \gamma_2$$
$$\xi_0 = x_0 \cdot \sin \gamma_2 \cdot \sin \gamma_1 - z_0 \cdot \cos \gamma_2 \cdot \sin \gamma_1 y_0 \cdot \cos \gamma_1 \quad (3)$$

in which $\gamma_1$ and $\gamma_2$ are values defined above. When the change (enlargement or reduction) of the scale of the parallel projection plane 2 is further required, corresponding scale transformation is performed. After the scale transformation, the parallel projection plane is changed to the memory $M_2'$. Although the case where the scale transformation is not performed will be described hereunder, either of the cases can be employed. For example, in the case where the subject of projection such as the inside of a blood vessel is small, the enlargement of the scale is performed.

In a step $F_{11}$, the distance DP between the projection-subject point S $(x_0, y_0, z_0)$ and the parallel projection point $(\eta_0, \xi_0)$ thereof is obtained from the following expression (4). The value of DP corresponds to the pixel value on the parallel projection plane 2.

$$DP = |x_0 \cdot \cos \gamma_1 \cdot \cos \gamma_2 + z_0 \cdot \cos \gamma_1 \cdot \sin \gamma_2 + y_0 \cdot \sin \gamma_1 - D_0| \quad (4)$$

in which $D_0$ is the distance between the parallel projection plane 2 and an intersection between the computerized tomographic plane containing the projection-subject point S and the y axis. Because the y axis is set to be the central position of the computerized tomographic plane, the intersection between the computerized tomographic plane and the y axis means the central position of the computerized tomographic plane.

In a step $F_{12}$, the pixel value (pixel value $DP_1$ of the memory part 40 in FIG. 7) of the position $(\eta_0, \xi_0)$ of the memory $M_2$ is compared with DP in the expression 4. If the memory $M_2$ is still cleared to be zero in the step $F_1$ as it is, the result of the comparison is necessarily DP>0 and the situation of the routine goes to a step $F_{14}$ in which DP as a pixel value is overwritten in the position $(\eta_0, \xi_0)$ of the memory $M_2$ (the term "overwriting" means that the past DP is deleted and a new DP is written). Generally, whenever a new DP is obtained, the new DP is compared with the past DP. If the new DP is larger than the past DP, the past DP is replaced by the new DP. By providing this step $F_{12}$, the largest DP is finally stored in each pixel of the memory $M_2$ correspondingly to each projection point. The term "largest" used herein means the largest one of DPs corresponding to a plurality of projection-subject points in the case where parallel projection is performed from the plurality of projection-subject points onto one projection point. Further, if the result of the comparison shows that the new DP is smaller than the past DP, the value of the past DP is left in the memory $M_2$ without any change.

In a step $F_{13}$, the pixel value (pixel value $DP_Z$ of the memory part 44 in FIG. 8) of the projection position R (X, Y) of the memory $M_3$ is compared with the DP in the expression 4. If the DP is smaller than the pixel value, the situation of the routine goes to a step $F_{15}$ in which the DP is overwritten in the projection position R (X, Y) of the memory $M_3$. If the DP is conversely larger than the pixel value, the last DP is left without overwriting. Incidentally, because the memory $M_3$ is initialized to the maximum value in the step $F_2$, the maximum value is always replaced by the new DP in the first comparison after the initialization and a smaller DP is overwritten in the comparison afterward.

By providing this step $F_{13}$, the smallest DP can be stored in the memory $M_3$ correspondingly to each projection point.

In a step $F_{16}$, the X ordinate value on the projection plane 1 (memory $M_1$) is updated so that a series of steps $F_4$ to $F_{15}$ is repeated unless the X ordinate value takes the maximum ordinate value in the display area. If the X ordinate value reaches the maximum ordinate value, the Y ordinate value is updated in a step $F_{18}$ and the X ordinate value is returned to the original ordinate value $X=X_C-(m/2)$. Then, a series of steps $F_4$ to $F_{19}$ is repeated unless Y reaches the maximum ordinate value on the display area.

In a step $F_{20}$, all the pixel values D of the memory $M_1$ obtained in the step $F_{30}$ are replaced by pixel values D' given by the following expression. $D_{max}$ is the maximum pixel value (set value).

$$D'=D_{max}-D \qquad (5)$$

The pixel values D' are pixel values shaded by a depth method. Other shading methods may be used.

Further, in the step $F_{20}$, all the pixel values DP of the memory $M_2$ obtained in the steps $F_{12}$ and $F_{14}$ are replaced by pixel values DP' given by the following expression. $DP_{max}$ is the maximum pixel value (set value). The pixel values DP' are pixel values shaded by a depth method. Other shading methods may be used.

$$DP'=DP_{max}-DP \qquad (6)$$

Thus, an image subjected to the display pixel selection process and shaded is obtained in the memory $M_1$ whereas an image which is farthest from the cut plane and shaded is obtained in the memory $M_2$.

The image of the memory $M_1$ and the image of the memory $M_2$ obtained in the step $F_{20}$ of FIG. 10 are delivered to the display device and displayed as images. Here, the image of the memory $M_1$ is an image as if the image was observed under an endoscope as shown in FIG. 4, whereas the image of the memory $M_2$ is an image as shown in FIG. 6. The position of the current view point $E_1$ is displayed on the image shown in FIG. 6, so that an arbitrary position different from the view point $E_1$ is designated as the position of a new view point $E_2$ by using the view point $E_1$ as the reference point. By designating the new view point $E_2$ through a cursor, the computer can fetch the position $(\eta_i, \xi_i)$ of the new view point $E_2$.

Figure 12:
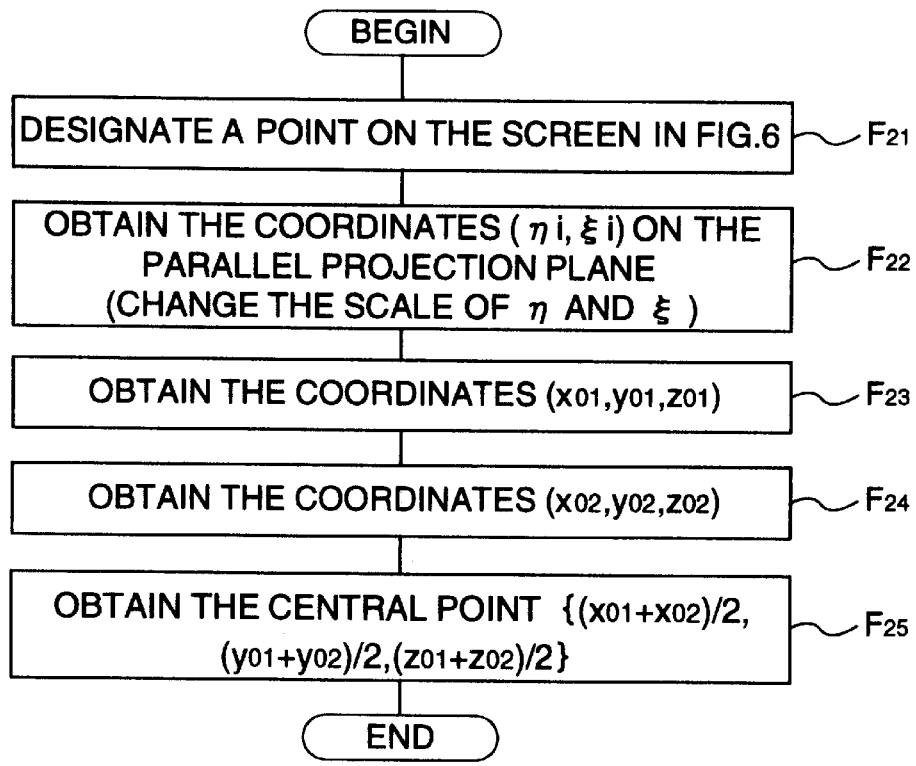
FIG. 12 is a flow chart showing an embodiment of calculation of coordinates of a new view point on an image obtained by a parallel projection method.

FIG. 12 is a flow chart of a process for setting such a new view point $E_2$, reading the coordinates thereof and transforming the coordinates. In a step $F_{21}$, the position of the new view point $E_2$ is designated as a point on the display screen in FIG. 6 through a cursor. In a step $F_{22}$, the designated coordinates (coordinates of the parallel projection plane) of the new view point $E_2$ $(\eta_i, \xi_i)$ are read out. Further, if scale transformation is required, the read-out coordinates are changed in scale (enlarged or reduced) to the coordinates before the scale transformation.

Further, in a step $F_{23}$, corresponding coordinates $(x_{01}, y_{01}, z_{01})$ on the memory parts 41, 42 and 43 of the memory $M_2$ are read from the designated coordinates $(\eta_i, \xi_i)$ in FIG. 7. Because the coordinates $(\eta_i, \xi_i)$ thus read-out are vertical and horizontal addresses of the memory part 40 of the memory $M_2$ in FIG. 7 and the coordinates of points (projection-subject points) on the computerized tomographic images corresponding to the addresses are stored in the memory parts 41, 42 and 43, the coordinates $(x_{01}, y_{01}, z_{01})$ of corresponding projection-subject points are read out by accessing the memory parts 41, 42 and 43 on the basis of the coordinates $(\eta_i, \xi_i)$.

In a step $F_{24}$, corresponding coordinates $(x_{02}, y_{02}, z_{02})$ on the memory parts 45, 46 and 47 of the memory $M_3$ in FIG. 8 are read from the designated coordinates $(\eta_i, \xi_i)$. Because the memory parts 45, 46 and 47 are addressed by the same address $(\eta, \xi)$ as the address of the memory part 44 and the coordinates $(x_{02}, y_{02}, z_{02})$ of the projection-subject point corresponding to the address $(\eta, \xi)$ are stored in the memory parts 45, 46 and 47, the coordinates $(x_{02}, y_{02}, z_{02})$ can be read out.

In a step $F_{25}$, the coordinates $(x_{01}, y_{01}, z_{01})$ and $(x_{02}, y_{02}, z_{02})$ of two projection-subject points thus read-out are averaged so that the average thereof is regarded as the central point. The coordinates $(x_{01}, y_{01}, z_{01})$ represent a point which is farthest from the parallel projection plane 2, the coordinates $(x_{02}, y_{02}, z_{02})$ represent a point which is nearest to the parallel projection plane 2, and the average value $\{(x_{01}+x_{02})/2, (y_{01}+y_{02})/2, (z_{01}+z_{02})/2\}$ thereof becomes the central point of the two. Such a process in the step $F_{25}$ is useful for the following example. In the case of a tubular tissue such as a blood vessel or a trachea, it is assumed that the coordinates of a point which is farthest from the parallel projection plane 2 on the inner wall of the tubular tissue are stored in the memory parts 41, 42 and 43, whereas the coordinates of the nearest point on the inner wall are stored in the memory parts 45, 46 and 47. With respect to the new view point $E_2$ thus set, there is a hollow in the direction perpendicular to the plane of paper in FIG. 6. The central point of the hollow is optimum as the new view point $E_2'$. Accordingly, the central point obtained in the step $F_{25}$ is set as the position of the new view point $E_2'$. Then, a new pseudo-three-dimensional image is obtained by executing the flow chart of FIG. 10 by use of the new view point $E_2'$.

Incidentally, the memory part 44 of the memory $M_3$ is not always required to be displayed. This is because the memory part 44 is merely used as a temporary buffer memory for obtaining the central point in the step $F_{25}$. In the case where the inner surface on the side of the pixel points 31, 33 and 35 in FIG. 9 is required to be observed, the memory part 44 may be displayed on the display screen.

As the new view point, it is not limited to the averaged point. An optional point between the two projection-subject points read out in the steps $F_{23}$ and $F_{24}$ can be set to the position of a new view point. In this case, the coordinates of the optional point are obtained by an interpolation.

The relation between the projection-subject point S and the projection point R for projecting the pixel position S $(x_0, y_0, z_0)$ onto the projection point R $(x, y, z)$ in the step $F_5$ of FIG. 10, and the transform expression for transforming the projection point R $(x, y, z)$ into the coordinates R $(X, Y)$ in the coordinate system on the projection plane will be described below.

First, the projection plane 1 is defined in the x-y-z coordinate system as follows.

$$(x/a)+(y/b)+(z/c)=1 \qquad (7)$$

On the other hand, the line L passing the point E $(x_1, y_1, z_1)$ and the point R $(x, y, z)$ is given in the x-y-z coordinate system as follows.

$$(x_0-x)/(x_1-x)=(y_0-y)/(y_1-y)==(z_0-z)/(z_1-z) \qquad (8)$$

Because the projection plane 1 intersects perpendicularly a view line at the point $C_1$ $(x_{C1}, y_{C1}, z_{C1})$, $k_1 = \sin \alpha$ $k_2 = \cos \alpha/\sin \beta$ $k_3 = \cos \alpha \cdot \cos \beta/\sin \beta$ $$a_i = 1/a$$

$$b_i = 1/b$$

$$c_i = 1/c \tag{9}$$

in the above condition, the relations of x, y and z at the point R (x, y, z) with X and Y at the point R (X, Y) in the X-Y coordinate system set on the projection plane 1 are as follows.

$$z = [X \cdot k_1 - Y \cdot k_2 - y_{C1} \cdot k_3 - \{(c_i \cdot k_3 \cdot z_{C1})/b_i\} + \{(a_i \cdot k_3 \cdot X)/(b_i \cdot \cos\alpha)\} - \{(a_i \cdot k_3 \cdot x_{C1})/b_i\}]/[1 - \{(c_i \cdot k_3)/b_i\} + \{(a_i \cdot k_3 \cdot \sin\alpha)/(b_i \cdot \cos\alpha)\}]$$

$$x = (X - z \cdot \sin\alpha)/\cos\alpha$$

$$y = [y_{C1} + \{-c_i \cdot (z - z_{C1}) - a_i \cdot (x - x_{C1})\}]/b_i \tag{10}$$

Here, the coordinates ($x_{C1}$, $y_{C1}$, $z_{C1}$) of the aforementioned point $C_1$ are expressed as follows:

$$z_{C1} = z_1 \pm \left[ h / \sqrt{1 + (c^2/a^2) + (c^2/b^2)} \right]$$

("−" in "$z_1 \pm$" holds in the condition $z_0 < z_{C1}$)

$$x_{C1} = x_1 + \{c \cdot (z_1 - z_{C1})/a\}$$

$$y_{C1} = y_1 + \{c \cdot (z_1 - z_{C1})/b\} \tag{11}$$

in which h is the distance between the point $C_1$ and the view point E.

Although the relation between the projection plane and the display screen has been described above, the projection plane means a projection memory defined in the X-Y coordinate system, and the whole or extracted part of the projection memory is delivered to the display memory and displayed on the display screen.

When the image projected onto the projection plane 1 is displayed in a range of 512×512 pixels on the display screen (not shown) of the display device, each of X and Y takes a value of −256 to +256. On the basis of the expression 10, x, y and z are determined correspondingly to X and Y. Because $x_1$, $y_1$ and $z_1$ at the point E are given desiredly, the coordinates $x_0$ and $z_0$ of the pixel point S on the tomographic image of $y = y_0$ are determined on the basis of the expression 12.

$$x_0 = \{(y_0 - y)/(y_1 - y)\} \times (x_1 - x) + x$$

$$z_0 = \{(y_0 - y)/(y_1 - y)\} \times (z_1 - z) + z \tag{12}$$

These $x_0$ and $z_0$ form a displayed point.

The aforementioned coordinate transformation is applied to all of the points on the projection plane 1 correspondingly to the display screen and applied to all tomographic images 3.

Figure 13:
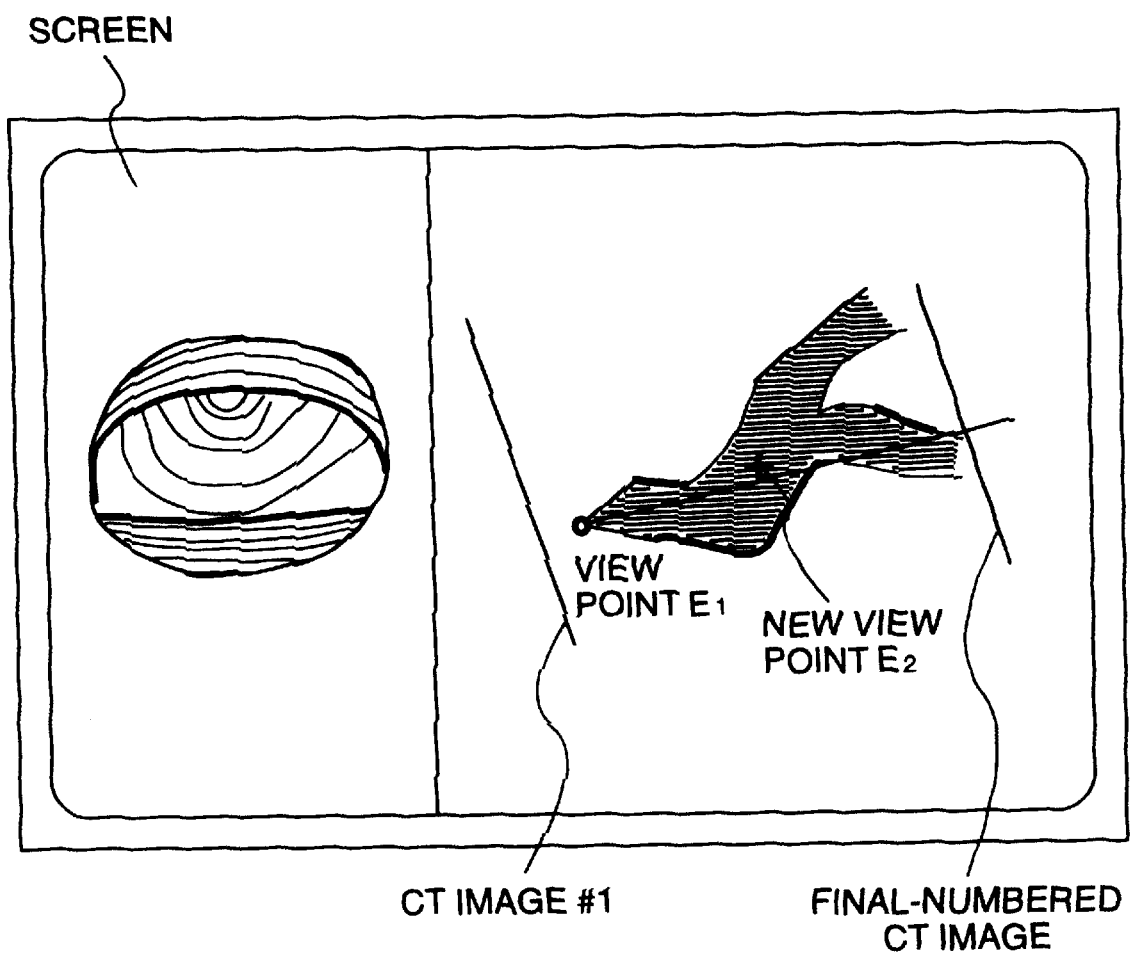
FIG. 13 is a view showing an example of display of images obtained by a central projection method and a parallel projection method respectively.

Although the central projection image and the parallel projection image may be displayed individually as shown in FIGS. 4 and 6 when the images are displayed on the display device, the central projection image and the parallel projection image may be displayed simultaneously side by side as shown in FIG. 13. In such a manner, it becomes easy to set and identify the new view point.

Figure 14:
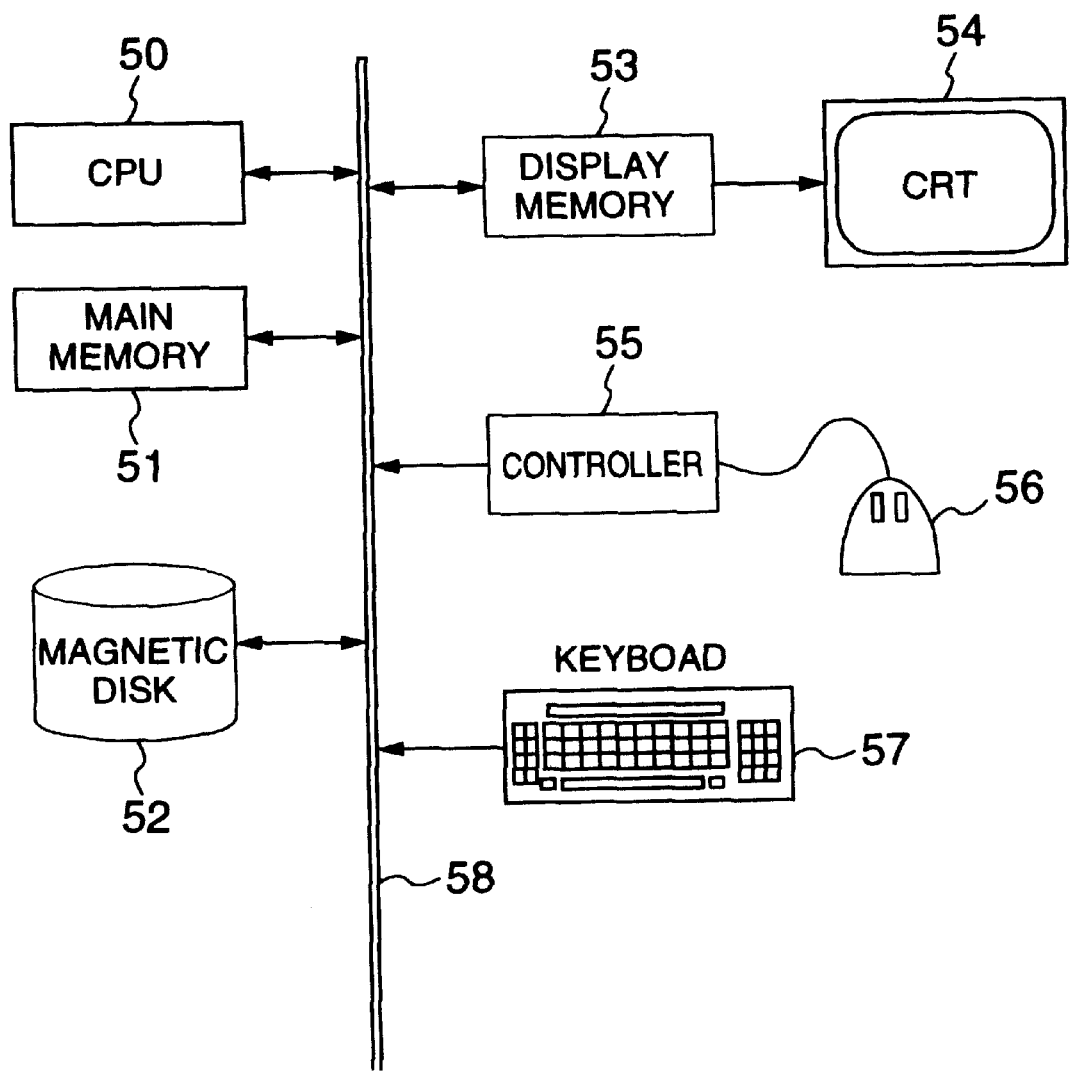
FIG. 14 is a view showing an embodiment of an image processing system for carrying out the present invention.

FIG. 14 shows a system diagram of the projection display apparatus according to the present invention. The projection display apparatus comprises a CPU 50, a main memory 51, a recording medium 52 such as a magnetic disk, a magneto-optical disk, and so on, a display memory 53, a CRT 54, a controller 55, a mouse 56, a keyboard 57, and a common bus 58. Respective tomographic images are stored in the magnetic disk 52, so that the CPU 50 performs predetermined processing in accordance with a projection display software (FIGS. 10 and 12) on the main memory 51. The main memory 51 may include a recording medium such as a magnetic tape, a magnetic disk, a magneto-optical disk, and so on in which the software shown in FIGS. 10 and 12 is stored. In this processing, an input/output process and a processing operation are carried out by using the mouse 56 or keyboard 57. The stacked three-dimensional image is displayed on the CRT 54 through the display memory 53, so that the processing in FIGS. 10 and 12 is performed by the operation of an operator, or the like. Further, the contents of a memory $M_2$ or $M_2'$ which is a part of the main memory 51 or magnetic disk 52 are displayed so that the view point is updated by the operator while the contents of the memory $M_2$ or $M_2'$ are being read by the operator. Endoscopic images, which are newly obtained in a memory $M_1$ (which is also a part of the main memory 51 or magnetic disk 52) by updating the view point, appear successively on the screen so that therapeutic planning information can be provided or various kinds of information for diagnosis, inspection, therapy, and so on, can be provided to the operator. Further, the contents thus displayed are stored in the magnetic disk 52 so that they can be used to be displayed again.

Although the embodiments have been described upon the case where computerized tomographic images are used, the present invention can be applied also to MRI images. Further, the parallel projection image may be displayed merely as an image to be observed.

The present invention is not limited to the aforementioned embodiments and various changes of the present invention may be made without departing from the scope of claim.

What is claimed is:

1. A method of constructing a projection image comprising the steps of:

obtaining a first projection image from a stacked three-dimensional image by a central projection method; and obtaining a second projection image from said stacked three-dimensional image by a parallel projection method.

2. A method of constructing a pseudo-three-dimensional image comprising the steps of:

a) setting a point of view and a first projection plane with respect to a stacked three-dimensional image;

b) projecting projection-subject points of said stacked three-dimensional image onto said first projection plane by a central projection method and shading said projection-subject points to thereby obtain a first pseudo-three-dimensional image;

c) setting a second projection plane with respect to said stacked three-dimensional image so that a predetermined angle is formed between said first projection plane and said second projection plane; and d) projecting a region containing at least said view point or a neighborhood of said view point as a projection-subject region onto said second projection plane by a parallel projection method and shading said region to thereby obtain a second pseudo-three-dimensional image.

3. A method of constructing a pseudo-three-dimensional image according to claim 2, wherein the step of obtaining said second pseudo-three-dimensional image includes the step of forming said second pseudo-three-dimensional image from a pixel point which is nearest to said second projection plane when a plurality of projection-subject points exist on a projection line.

4. A method of constructing a pseudo-three-dimensional image according to claim 2, further comprising the step of displaying said first and second pseudo-three-dimensional images side by side on a same display screen.

5. A method of constructing a pseudo-three-dimensional image according to claim 2, further comprising the step of determining a position of a new view point for said stacked three-dimensional image by using said second pseudo-three-dimensional image.

6. A method of constructing a pseudo-three-dimensional image according to claim 5, wherein the step of determining said position of said new view point includes the steps of:
  designating a position of said new view point on said second pseudo-three-dimensional image;
  obtaining coordinates of a point between a projection-subject point which is nearest to said second projection plane and a projection-subject point which is farthest from said second projection plane on the basis of respective coordinates of said nearest and farthest projection-subject points among projection-subject points corresponding to said designated position of said new view point; and
  setting said coordinates of said point as a position of said new view point.

7. A method of constructing a pseudo-three-dimensional image according to claim 2, wherein the step of setting said second projection plane includes the step of setting said second projection plane with a positional relation so that said second projection plane is perpendicular to said first projection plane.

8. A method of constructing a pseudo-three-dimensional image comprising the steps of:
  1) initializing a memory $M_1$ corresponding to a central projection plane and memories $M_2$ and $M_3$ corresponding to a parallel projection plane, wherein said parallel projection plane is set on a memory space with a positional relation so as to form a predetermined angle between said parallel projection plane and said central projection plane;
  2) setting initial coordinates of a display screen on said central projection plane;
  3) setting a point of view and obtaining coordinates of a projection-subject point on a stacked three-dimensional image to be centrally projected;
  4) obtaining a distance D between said view point and said projection-subject point and writing said distance D in said memory $M_1$, wherein a minimum distance D is written in said memory $M_1$ when there are a plurality of projection-subject points;
  5) obtaining coordinates of a parallel projection point projected onto said parallel projection plane from said projection-subject point by a parallel projection method;
  6) obtaining a distance DP between said projection-subject point and said parallel projection point;
  7) executing the steps 3) to 6) whenever said coordinates of said display screen are updated, storing a maximum value of said distance DP in said memory $M_2$ with respect to the obtained parallel projection points, and storing a minimum value of said distance DP in said memory $M_3$;
  8) shading the value of the distance D stored in the memory $M_1$ to thereby obtain a first pseudo-three-dimensional image; and
  9) shading the value of the distance DP stored in the memory $M_2$ to thereby obtain a second pseudo-three-dimensional image.

9. A method of constructing a pseudo-three-dimensional image according to claim 8, further comprising the steps of:
  recognizing a given position designated on said second pseudo-three-dimensional image by an operator, as a position of a new view point;
  reading coordinates of said projection-subject points corresponding to said designated position from said memories $M_2$ and $M_3$ and obtaining a position of a point between the thus read coordinates; and
  setting said position of said point as a position of said new view point.

10. A recording medium comprising:
  1) a code portion for initializing a memory $M_1$ corresponding to a central projection plane and memories $M_2$ and $M_3$ corresponding to a parallel projection plane, wherein said parallel projection plane is set on a memory space with a positional relation so as to form a predetermined angle between said parallel projection plane and said central projection plane;
  2) a code portion for setting initial coordinates of a display screen on said central projection plane;
  3) a code portion for setting a point of view and obtaining coordinates of a projection-subject point on a stacked three-dimensional image to be centrally projected;
  4) a code portion for obtaining a distance D between said view point and said projection-subject point and writing said distance D into said memory $M_1$, wherein a minimum distance D is written in said memory $M_1$ when there are a plurality of projection-subject points;
  5) a code portion for obtaining coordinates of a parallel projection point projected onto said parallel projection plane from said projection-subject point by a parallel projection method;
  6) a code portion for obtaining a distance DP between said projection-subject point and said parallel projection point;
  7) a code portion for executing the code portions 3) to 6) whenever said coordinates of said display screen are updated, storing a maximum value of said distance DP in said memory $M_2$ with respect to the obtained parallel projection points, and storing a minimum value of said distance DP into said memory $M_3$;
  8) a code portion for shading the value of the distance D stored in the memory $M_1$ to thereby obtain a first pseudo-three-dimensional image; and
  9) a code portion for shading the value of the distance DP stored in the memory $M_2$ to thereby obtain a second pseudo-three-dimensional image.

11. A recording medium according to claim 10, further comprising:
  a code portion for recognizing a given position designated on said second pseudo-three-dimensional image by an operator, as a position of a new view point;
  a code portion for reading coordinates of said projection-subject points corresponding to said designated position from said memories $M_2$ and $M_3$ and obtaining a position of a point between the thus read coordinates;
  a code portion for setting said position of said point as a position of said new view point; and
  a code portion for performing an instruction to obtain new first and second pseudo-three-dimensional images by using said new view point.

12. An apparatus for displaying a projection image comprising:

a first memory for storing a first pseudo-three-dimensional image obtained by setting a point of view and a central projection plane with respect to a stacked three-dimensional image on a memory space, obtaining a central projection image centrally projected from said stacked three-dimensional image correspondingly to a region of interest and shading said central projection image;

means for setting a parallel projection plane with a positional relation so as to form a predetermined angle between said central projection plane and said parallel projection plane, and parallelly projecting said stacked three-dimensional image correspondingly to said region of interest;

a second memory for storing a second pseudo-three-dimensional image obtained by shading the pixel value of a parallel projection-subject point which is farthest from said parallel projection plane with respect to respective projection points on said parallel projection plane;

a third memory for storing a parallel projection-subject point which is nearest to said parallel projection plane with respect to the respective projection points on said parallel projection plane;

means for displaying said first and second pseudo-three-dimensional images individually or simultaneously; and means for determining a position of a new view point by an operator's designation on a position of said new view point on said displayed second pseudo-three-dimensional image.

13. An apparatus for displaying a projection image according to claim 12, wherein said means for determining the position of said new view point includes:

means for reading said parallel projection-subject points corresponding to said position designated by said operator, from said second and third memories; and means for determining a position between said read parallel projection-subject points, as a position of said new view point.

14. An apparatus for displaying a projection image according to claim 12, wherein said parallel projection means includes means for setting said parallel projection plane with a positional relation so as to be perpendicular to said central projection plane.

15. A method of constructing a projection image according to claim 1, further comprising the step of displaying said first projection image and said second projection image on a same screen.

16. An apparatus for constructing a projection image, comprising:

central projection means for obtaining a first projection image from a stacked three-dimensional image by a central projection method;

parallel projection means for obtaining a second projection image from the stacked three-dimensional image by a parallel projection method; and display means for displaying the first projection image and the second projection image.

17. An apparatus for constructing a projection image according to claim 16, wherein the display means includes means for displaying the first projection image and the second projection image side by side on a same screen.

18. An apparatus for constructing a projection image, comprising:

first image constructing means for obtaining a first projection image based on an arbitrary view point on a first projection plane from a stacked three-dimensional image disposed between the view point and the first projection plane;

second image constructing means for obtaining a second projection image on a second projection plane from the stacked three-dimensional image, the second projection plane being disposed at a predetermined angle with respect to the first projection plane; and display means for displaying the first projection image and the second projection image.

19. An apparatus for constructing a projection image according to claim 18, wherein the display means includes means for displaying the first projection image and the second projection image on a same screen.

20. An apparatus for constructing a projection image according to claim 18, wherein the second projection image includes information about a position of the view point of the first projection image.

21. An apparatus for constructing a projection image according to claim 18, further comprising update means for updating the first projection image to a new first projection image based on a new view point by designating an arbitrary position of the new view point in the second projection image.

22. An apparatus for constructing a projection image according to claim 21, wherein the second projection image includes information about (1) a position of the new view point for the new first projection image and (2) at least one of (a) a position of the view point for the first projection image and (b) a position of a previous view point for a previous first projection image.

23. An apparatus for constructing a projection image according to claim 18, wherein the second projection plane is substantially perpendicular to the first projection plane.

24. An apparatus for constructing a projection image comprising:

main projection image constructing means for obtaining a main projection image based on a view point on a projection plane from a stacked three-dimensional image disposed between the view point and the projection plane;

sub-projection image constructing means for obtaining a sub-projection image to confirm a position of the view point of the main projection image from the stacked three-dimensional image;

display means for displaying the main projection image and the sub-projection image;

input means for inputting a position of a new view point for a new main projection image into the sub-projection image; and update means for updating the main projection image to the new main projection image based on the new view point in response to the inputting of the position of the new view point into the sub-projection image.

* * * * *